(12) United States Patent
Imai et al.

(10) Patent No.: US 8,758,866 B2
(45) Date of Patent: *Jun. 24, 2014

(54) PROCESS FOR PRODUCING COMPOSITE OF METAL AND RESIN

(75) Inventors: Hideyuki Imai, Aichi-ken (JP); Yoshinori Nagamori, Aichi-ken (JP); Shinichi Takeda, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 143 days.

This patent is subject to a terminal disclaimer.

(21) Appl. No.: 12/979,717

(22) Filed: Dec. 28, 2010

(65) Prior Publication Data

US 2011/0165342 A1    Jul. 7, 2011

(30) Foreign Application Priority Data

Jan. 7, 2010   (JP) ................................ 2010-002153

(51) Int. Cl.
*H05H 1/00* (2006.01)
*B05D 3/00* (2006.01)
*B29C 71/02* (2006.01)
*B29C 71/04* (2006.01)
*B29C 45/14* (2006.01)
*B29C 65/00* (2006.01)
*B29K 81/00* (2006.01)
*B29K 705/02* (2006.01)

(52) U.S. Cl.
CPC ........... *B29C 45/14311* (2013.01); *B29C 66/71* (2013.01); *B29K 2081/04* (2013.01); *B29K 2705/02* (2013.01)
USPC ................ 427/535; 528/9; 427/532; 427/533

(58) Field of Classification Search
CPC .................... B29C 66/71; B29C 65/00; B29C 2045/14885; B29C 45/14311; B29K 2081/01
USPC ........................................................ 427/535
See application file for complete search history.

(56) References Cited

U.S. PATENT DOCUMENTS

| | | | | |
|---|---|---|---|---|
| 4,524,089 A | * | 6/1985 | Haque et al. | 427/488 |
| 4,689,111 A | * | 8/1987 | Chan et al. | 216/35 |
| 5,178,962 A | * | 1/1993 | Miyamoto et al. | 428/463 |
| 5,182,151 A | * | 1/1993 | Furuta et al. | 428/36.92 |
| 5,384,167 A | * | 1/1995 | Nishiwaki et al. | 427/569 |
| 6,203,919 B1 | * | 3/2001 | Takebe et al. | 428/461 |
| 6,824,730 B2 | * | 11/2004 | Mashita et al. | 264/480 |
| 2005/0129935 A1 | * | 6/2005 | Kunitake et al. | 428/336 |
| 2009/0082525 A1 | * | 3/2009 | Nakamura et al. | 525/122 |
| 2009/0269599 A1 | * | 10/2009 | Tsurumi | 428/458 |
| 2010/0197882 A1 | | 8/2010 | Imai et al. | |

FOREIGN PATENT DOCUMENTS

| | | | | |
|---|---|---|---|---|
| EP | 0522163 A1 | * | 1/1993 | ......... C08F 8/30 |
| JP | A-05-214071 | | 8/1993 | |
| JP | A-6-88242 | | 3/1994 | |
| JP | A-2004-058646 | | 2/2004 | |

OTHER PUBLICATIONS

Kim Shyong Siow, Leanne Britcher, Sunil Kumar, Hans J. Griesser. Plasma Methods for the Generation of Chemically Reactive Surfaces for Biomolecule Immobilization and Cell Colonization—A Review. 2006. Plasma Process. Polym. 3, 392-418.*

* cited by examiner

*Primary Examiner* — Dah-Wei D Yuan
*Assistant Examiner* — Kristen A Dagenais
(74) *Attorney, Agent, or Firm* — Posz Law Group, PLC

(57) ABSTRACT

The metal part is one where a carboxyl group or an amino group, or a hydroxyl group is imparted onto the surface. On the other hand, the resin part is one into which an adhesiveness modifier containing an epoxy group is blended. A process for producing a composite of metal and resin, wherein the metal part and the resin part are bonded by interaction of the carboxyl group or the amino group, or the hydroxyl group with the epoxy group.

17 Claims, No Drawings

PROCESS FOR PRODUCING COMPOSITE OF METAL AND RESIN

BACKGROUND OF THE INVENTION

1. Field of the Invention

The present invention relates to a process for producing a composite comprising a metal part composed of a metal and a resin part composed of a resin bonded together.

2. Related Art

In these days, there have been developed various composites where distinct materials are bonded together and characteristics of the materials are utilized. Particularly, since a composite of metal and resin has distinctness, it is considered that its use application will be further extended in future.

In the composite of metal and resin, as a method for bonding a metal and a resin, there have been proposed a method of blending an epoxy resin into a polyarylene sulfide-based resin and bonding the metal and the resin (JP-A-5-214071) and a method of forming a film of a thermally modified epoxy resin on a metal surface to bond the metal and the resin (JP-A-2004-58646). However, by these methods, a sufficient adhesiveness has not been attainable.

In addition, as a modification method of a metal surface, a method of plasma-excitation of a mixed gas of an inert gas and a reactive gas of a carbon-containing compound or a sulfur-containing compound (JP-A-6-88242) has been proposed.

Wettability of the metal surface modified by this method is improved but the adhesiveness with the resin is uncertain.

SUMMARY OF THE INVENTION

Accordingly, an object of the invention is to provide a process for producing a composite of metal and resin wherein a metal part composed of a metal and a resin part composed of a resin are strongly bonded without using any adhesive.

The fact that the metal part and the resin part are strongly bonded means that both of the parts are bonded so that breaking of the composite does not take place at the interface of both of the parts when both of the parts are drawn in opposite directions.

The process for producing a composite of metal and resin of the invention for solving the above problems is a process for producing a composite of metal and resin comprising a metal part composed of a metal and a resin part composed of a resin bonded together, which comprises steps of:

performing a plasma treatment of generating plasma in a discharging gas to activate an organic substance by a radical formed by the plasma and imparting a polar functional group onto a surface of the metal part with the activated organic substance, performing a blending treatment of blending into the resin an adhesiveness modifier containing an adhesive functional group which interacts with the polar functional group to prepare a molding material, and subsequently molding the resin part using the molding material so as to come into contact with the metal part to bond the metal part and the resin part.

The embodiment where the polar functional group is imparted onto the surface includes an embodiment where a layer of a compound containing the polar functional group is formed on the surface and thereby the polar functional group is imparted and an embodiment where the polar functional group is directly imparted onto the surface by a chemical bond or the like between the polar functional group and the metal surface. Herein, the fact that the polar functional group is imparted onto the surface includes both of the embodiments.

Moreover, the interaction between the polar functional group and the adhesive functional group may be a covalent bond or an ionic bond as a chemical bond that acts between both groups and may be a hydrogen bond or a van der Waals bond as a physical bond.

Examples of embodiments of individual elements in the invention are shown in the following.

1. Metal Part

Examples of embodiments of the metal part may include plate-like ones, foil-like ones, and lump-like ones. According to use applications of the composite, the metal part may be formed into a predetermined shape beforehand by a processing machine or the like or may be formed into a predetermined shape after bonding to the resin part.

Examples of the metal to be used for the metal part may include aluminum, copper, nickel, tin, gold, silver, iron, magnesium, chromium, tungsten, zinc, lead, and alloys thereof such as stainless steel and brass.

As a surface-treating method for imparting the polar functional group onto a surface of the metal part, an inert gas such as argon gas or helium gas as a discharging gas is fed into a plasma apparatus and plasma is generated in the apparatus to activate an organic substance such as acrylic acid or allylamine, or an organic silane compound. In this regard, the plasma may be generated under atmospheric pressure or under reduced pressure but is preferably generated under atmospheric pressure in view of simplicity and workability.

An embodiment where a layer of a compound containing the polar functional group is formed on the surface and thereby the polar functional group is imparted is a case where a film is formed by irradiation of a metal surface with activated acrylic acid or allylamine, or organic silane compound.

An embodiment where the polar functional group is directly imparted onto the surface by a chemical bond or the like between the polar functional group and the metal surface is a case where the metal surface is directly irradiated with the polar functional group formed from activated acrylic acid or allylamine, or organic silane compound.

Examples of the organic silane compound may include hexamethyldisiloxane (HMDSO) as an alkylsilane compound and tetraethoxysilane (TEOS) as an alkoxysilane compound.

Examples of the polar functional group to be imparted onto the surface of the metal part may include a carboxyl group, an amino group, a hydroxyl group, and an aldehyde group. Owing to easy impartment onto the surface of the metal part, a carboxyl group, an amino group, and a hydroxyl group are preferred.

2. Resin Part

Examples of embodiments of the resin part include plate-like ones, film-like ones, and lump-like ones. According to use applications of the composite, it is preferred to form the resin part into a predetermined shape at molding so as to come into contact with the metal part, owing to the reduction of the number of steps.

Examples of the resin to be used for the resin part may include engineering plastics such as polyphenylene sulfide (PPS), polyamides (PA), and polybutylene terephthalate (PBT) and commodity resins such as polyethylene (PE), polypropylene (PP), polystyrene (PS), and polyvinyl chloride (PVC). Since heat resistance and the like of the composite are improved, polyphenylene sulfide (PPS) is preferred. Moreover, in order to improve mechanical strength and the like, a glass fiber, an inorganic filler, and the like may be blended into the resin.

Polyphenylene sulfide (PPS) may be a crosslinked type having a two-dimensional or three-dimensional crosslinked structure via an oxygen atom in the molecule or may be a linear type where the molecule is linear (structural units are connected in a line).

The adhesiveness modifier to be blended into the resin is preferably one capable of being easily mixed with the resin homogeneously. Specifically, examples thereof may include a compound where a graft copolymer composed of polyethylene, polystyrene, or the like as a main chain and a styrene-based polymer as a side chain is modified with an adhesive functional group and a compound where polyethylene, polystyrene, or the like is modified with an adhesive functional group. Specific examples thereof may include a modified ethylene-styrene copolymer where a copolymer of ethylene with styrene is modified with glycidyl methacrylate or a modified polyethylene where polyethylene is modified with glycidyl methacrylate.

The content of the adhesiveness modifier varies depending on the kind of the adhesiveness modifier (kind of the adhesive functional group, amount of the adhesive functional group in the adhesiveness modifier, etc.) and is not particularly limited but is preferably from 5 to 40 parts by mass based on 100 parts by mass of the total amount of the resin and the adhesiveness modifier. When the content is less than 5 parts by mass, the adhesiveness of the resin part to the metal part decreases. When the value exceeds 40 parts by mass, mold releasability and the like at molding the resin part deteriorate. More preferred is from 10 to 30 parts by mass.

Examples of the adhesive functional group contained in the adhesiveness modifier may include an epoxy group (inclusive of an epoxy group in a glycidyl group, the same shall apply hereinafter), a carboxyl group, an amino group, and a hydroxyl group. Owing to easy reaction with the polar functional group, an epoxy group is preferred.

The content of the adhesive functional group in the resin to which the adhesiveness modifier is blended is preferably from 0.15 to 1.2 parts by mass based on the total amount of the resin and the adhesiveness modifier. When the content is less than 0.15 part by mass, the adhesiveness of the resin part to the metal part decreases. When the value exceeds 1.2 parts by mass, mold releasability and the like at molding the resin part deteriorate. More preferred is from 0.3 to 0.9 part by mass.

As a blending method for blending the adhesiveness modifier into the resin to prepare a molding material, a method of melt-kneading them at a predetermined temperature using a single-screw or twin-screw extruder or the like and forming a homogenized blend into pellets or the like may be mentioned as an example.

As a method for molding the resin part so as to come into contact with the metal part, insert molding using a mold which holds the metal part inside is preferred since the bonding of the metal part and the resin part and the molding of the resin part can be achieved at a time. Examples of the insert molding may include compression molding and injection molding. The molding may contain an annealing step.

3. Composite of Metal and Resin

Examples of embodiments of the composite of metal and resin may include plate-like ones, foil-like ones, cord-like ones, tubular ones, columnar ones, spherical ones, and lump-like ones.

Examples of the use applications of the composite of metal and resin may include electronic and electric components, architectural and civil engineering members, automobile parts, agricultural materials, packaging materials, cloths, and daily necessities or materials for manufacturing them. Examples of the automobile parts may include sealing members for sealing engine oil or the like and sealing members for sealing batteries for hybrid cars.

According to the invention, it is possible to provide a composite of metal and resin wherein a metal part composed of a metal and a resin part composed of a resin are strongly bonded without using any adhesive.

DETAILED DESCRIPTION OF THE PREFERRED EMBODIMENTS

EXAMPLES

In the production of the composite of metal and resin of the invention, a metal and a resin are bonded by a chemical bond (covalent bond) and a physical bond (hydrogen bond) between a metal surface onto which a carboxyl group or an amino group, or a hydroxyl group is imparted by a plasma treatment and a resin surface into which an adhesiveness modifier containing an epoxy resin is blended.

As the metal, aluminum (A1050) and copper (C1100) were used.

As a pretreatment of the metal, the metal surface was abraded with a sandpaper having a grain size of #1,000 to remove an oxide film. Then, the metal was immersed in hydrochloric acid at 23° C. for 1 minute to etch the surface. Further, it was immersed in an aqueous solution of a strong alkaline degreasing agent ("FC-E2001" from Nihon Parkerizing Co., Ltd.) at 70° C. for minute to perform degreasing.

For a plasma treatment on the metal surface, an atmospheric-pressure plasma treating apparatus that generates plasma by a high-frequency generator was employed. Argon gas was used as a discharging gas, and acrylic acid, allylamine, hexamethyldisiloxane (HMDSO), or tetraethoxysilane (TEOS) was used as an organic substance to be activated.

Conditions for plasma treatment:
Feed rate of argon gas: 0.2, 1.0, 2.0 (L/minute)
Feed rate of acrylic acid: 1.0, 2.0 (L/minute)
Feed rate of allylamine: 1.0 (L/minute)

In this regard, acrylic acid, allylamine, hexamethyldisiloxane (HMDSO), or tetraethoxysilane (TEOS) was fed using argon gas as a carrier gas.

As a resin, polyphenylene sulfide (PPS) was used.

As an adhesiveness modifier, a modified polyethylene-polystyrene copolymer (modified PE/PS) where a copolymer of ethylene with styrene is modified with glycidyl methacrylate (GMA) or a modified polyethylene (modified PE) where polyethylene is modified with glycidyl methacrylate (GMA) was used. Moreover, since both of the modified PE/PS and modified PE contains glycidyl methacrylate in an amount of 10% by mass, the content of the epoxy group is 3% by mass. Of these, the modified PE/PS is a compound where a graft copolymer having polyethylene as a main chain and a styrene-based monomer as a side chain contains an epoxy group (glycidyl group) as an adhesive functional group derived from modification of the polyethylene with GMA.

The mixing ratio of polyphenylene sulfide (PPS) to the adhesiveness modifier was fixed to 80/20 (weight ratio). A sample was prepared by melt-kneading them at 320° C. for 5 minutes using a Labo plastomill ("KF70V2" from Toyo Seiki Seisaku-Sho, Ltd.).

A plasma-treated metal piece (12 mm×15 mm) was placed in a mold and was subjected to compression molding (a size of a polyphenylene sulfide piece: 75 mm×15 mm×3 mm thick) at 320° C., i.e., a temperature at which polyphenylene sulfide was melted, thereby preparing a sample.

The adhesive force of the sample was measured in accordance with JIS K-6850 (a test method of tensile shear adhesive strength of an adhesive and a rigid adherend).

The evaluation results of adhesiveness of Examples and Comparative Examples are shown in Table 1. Cohesive failure at the whole resin part and cohesive failure at a part of the resin part were regarded as passing (adhesive strength of 3 MPa or more, marked with o) and interfacial failure between the metal part and the resin part was regarded as non-passing (adhesive strength of 0 MPa or more, marked with x).

In the adhesion test of the composite of polyphenylene sulfide into which the adhesiveness modifier was blended [ratio of 80/20 (weight ratio)] and the plasma-treated metal, the breaking is resin destruction, which shows a high adhesive force (Examples 1 to 10 with regard to aluminum and Examples 11 to 20 with regard to copper). This may be attributable to the fact that the carboxyl group or amino group, or hydroxyl group imparted onto the metal surface and the epoxy group in the resin are bonded by a covalent bond or a hydrogen bond.

On the other hand, in the case where the metal surface was not subjected to a plasma treatment (Comparative Examples 1 to 3 with regard to aluminum and Comparative Examples 11 to 13 with regard to copper), in the case where the metal surface was subjected to the plasma treatment but any organic substance imparting a polar functional group was not fed (Comparative Examples 4 to 6 with regard to aluminum and Comparative Examples 14 to 16 with regard to copper), in the case where any adhesiveness modifier is not blended into polyphenylene sulfide (Comparative Examples 7 to 10 with regard to aluminum and Comparative Examples 17 to 20 with regard to copper), interfacial failure between the metal part and the resin part took place. This is because destruction occurred at the interface since the adhesive force between the metal and the resin was weak.

TABLE 1

<Aluminum>

| | | | Comparative Example | | | | | | | | | |
|---|---|---|---|---|---|---|---|---|---|---|---|---|
| | | | 1 | 2 | 3 | 4 | 5 | 6 | 7 | 8 | 9 | 10 |
| Resin side | Resin | PPS | 100 | 80 | 80 | 100 | 80 | 80 | 100 | 100 | 100 | 100 |
| | Adhesion modifying treatment | Modified PE/PS | | 20 | | | 20 | | | | | |
| | | Modified PE | | | 20 | | | 20 | | | | |
| Metal side | Metal | Aluminum | • | • | • | • | • | • | • | • | • | • |
| | | Copper | | | | | | | | | | |
| | Metal surface treatment (conditions for plasma treatment) | Process gas | | | | Ar | Ar | Ar | Ar | Ar | Ar | Ar |
| | | Feed rate of process gas [L/min] | | | | 1.0 | 1.0 | 1.0 | 1.0 | 1.0 | 1.0 | 1.0 |
| | | Imparting compound | | | | | | | Acrylic acid | Allyl-amine | HMDSO | TEOS |
| | | Feed rate of imparting compound [L/min] | | | | | | | 1.0 | 1.0 | 1.0 | 1.0 |
| | | Output [W] | | | | 100 | 100 | 100 | 100 | 100 | 100 | 100 |
| | Adhesiveness | | x | x | x | x | x | x | x | x | x | x |

| | | | Example | | | | | | | | | |
|---|---|---|---|---|---|---|---|---|---|---|---|---|
| | | | 1 | 2 | 3 | 4 | 5 | 6 | 7 | 8 | 9 | 10 |
| Resin side | Resin | PPS | 80 | 80 | 80 | 80 | 80 | 80 | 80 | 80 | 80 | 80 |
| | Adhesion modifying treatment | Modified PE/PS | 20 | 20 | 20 | 20 | 20 | | 20 | | | |
| | | Modified PE | | | | | | 20 | | 20 | 20 | 20 |
| Metal side | Metal | Aluminum | • | • | • | • | • | • | • | • | • | • |
| | | Copper | | | | | | | | | | |
| | Metal surface treatment (conditions for plasma treatment) | Process gas | Ar | Ar | Ar | Ar | Ar | Ar | Ar | Ar | Ar | Ar |
| | | Feed rate of process gas [L/min] | 1.0 | 1.0 | 0.2 | 0.2 | 2.0 | 1.0 | 1.0 | 1.0 | 1.0 | 1.0 |
| | | Imparting compound | Acrylic acid | Acrylic acid | Acrylic acid | Acrylic acid | Acrylic acid | Acrylic acid | Allyl-amine | Allyl-amine | HMDSO | TEOS |
| | | Feed rate of imparting compound [L/min] | 1.0 | 1.0 | 1.0 | 1.0 | 2.0 | 1.0 | 1.0 | 1.0 | 1.0 | 1.0 |
| | | Output [W] | 100 | 30 | 100 | 30 | 100 | 100 | 100 | 100 | 100 | 100 |
| | Adhesiveness | | o | o | o | o | o | o | o | o | o | o |

<Copper>

| | | | Comparative Example | | | | | | | | | |
|---|---|---|---|---|---|---|---|---|---|---|---|---|
| | | | 11 | 12 | 13 | 14 | 15 | 16 | 17 | 18 | 19 | 20 |
| Resin side | Resin | PPS | 100 | 80 | 80 | 100 | 80 | 80 | 100 | 100 | 100 | 100 |
| | Adhesion modifying treatment | Modified PE/PS | | 20 | | | 20 | | | | | |
| | | Modified PE | | | 20 | | | 20 | | | | |

TABLE 1-continued

| | | | | | | | | | | | |
|---|---|---|---|---|---|---|---|---|---|---|---|
| Metal side | Metal | Aluminum | | | | | | | | | |
| | | Copper | • | • | • | • | • | • | • | • | • |
| | Metal surface treatment (conditions for plasma treatment) | Process gas | | | | Ar | Ar | Ar | Ar | Ar | Ar | Ar |
| | | Feed rate of process gas [L/min] | | | | 1.0 | 1.0 | 1.0 | 1.0 | 1.0 | 1.0 | 1.0 |
| | | Imparting compound | | | | | | | Acrylic acid | Allyl-amine | HMDSO | TEOS |
| | | Feed rate of imparting compound [L/min] | | | | | | | 1.0 | 1.0 | 1.0 | 1.0 |
| | | Output [W] | | | | 100 | 100 | 100 | 100 | 100 | 100 | 100 |
| | Adhesiveness | | x | x | x | x | x | x | x | x | x | x |

| | | | Example | | | | | | | | | |
|---|---|---|---|---|---|---|---|---|---|---|---|---|
| | | | 11 | 12 | 13 | 14 | 15 | 16 | 17 | 18 | 19 | 20 |
| Resin side | Resin | PPS | 80 | 80 | 80 | 80 | 80 | 80 | 80 | 80 | 80 | 80 |
| | Adhesion modifying treatment | Modified PE/PS | 20 | 20 | 20 | 20 | 20 | | 20 | | | |
| | | Modified PE | | | | | | 20 | | 20 | 20 | 20 |
| Metal side | Metal | Aluminum | | | | | | | | | | |
| | | Copper | • | • | • | • | • | • | • | • | • | • |
| | Metal surface treatment (conditions for plasma treatment) | Process gas | Ar | Ar | Ar | Ar | Ar | Ar | Ar | Ar | Ar | Ar |
| | | Feed rate of process gas [L/min] | 1.0 | 1.0 | 0.2 | 0.2 | 2.0 | 1.0 | 1.0 | 1.0 | 1.0 | 1.0 |
| | | Imparting compound | Acrylic acid | Acrylic acid | Acrylic acid | Acrylic acid | Acrylic acid | Acrylic acid | Allyl-amine | Allyl-amine | HMDSO | TEOS |
| | | Feed rate of imparting compound [L/min] | 1.0 | 1.0 | 1.0 | 1.0 | 2.0 | 1.0 | 1.0 | 1.0 | 1.0 | 1.0 |
| | | Output [W] | 100 | 30 | 100 | 30 | 100 | 100 | 100 | 100 | 100 | 100 |
| | Adhesiveness | | ○ | ○ | ○ | ○ | ○ | ○ | ○ | ○ | ○ | ○ |

The application is based on Japanese Patent Application No. 2010-002153, filed on Jan. 7, 2010, the entire contents of which are incorporated herein by reference.

What is claimed is:

1. A process for producing a composite of metal and resin comprising: a metal part composed of a metal and a resin part composed of a resin bonded together, which comprises:
   arranging the metal part;
   feeding a discharging gas into a plasma apparatus, the discharging gas including an organic substance including anyone of an acrylic acid and allylamine;
   generating a plasma containing a radical that activates the organic substance and the discharging gas;
   contacting the metal part with the plasma containing the activated organic substance and imparting a polar functional group onto a surface of the metal part, the polar functional group imparted onto the surface of the metal part including anyone of an unsaturated carboxyl group and an unsaturated amino group;
   preparing a molding material by blending the resin with an adhesiveness modifier containing an adhesive functional group which interacts with the polar functional group imparted onto the surface of the metal part, the adhesive functional group including anyone of an epoxy group, a carboxyl group, an amino group and a hydroxyl group; and
   forming the molding material on the surface of the metal part, wherein the polar functional group imparted on the surface of the metal part interacts with the adhesive functional group of the adhesive modifier contained within the molding material and bonds the metal part and the resin part.

2. The process for producing a composite of metal and resin according to claim 1, wherein the adhesiveness modifier is a modified ethylene-styrene copolymer where a copolymer of ethylene with styrene is modified with glycidyl methacrylate or a modified polyethylene where polyethylene is modified with glycidyl methacrylate.

3. The process for producing a composite of metal and resin according to claim 1, wherein the adhesive functional group is an epoxy group.

4. The process for producing a composite of metal and resin according to claim 1, wherein the resin is polyphenylene sulfide.

5. The process for producing a composite of metal and resin according to claim 1, wherein the metal is aluminum or copper.

6. The process for producing a composite of metal and resin according to claim 1, wherein the molding material contains from 5 to 40 parts by mass of the adhesiveness modifier based on 100 parts by mass of the total amount of the resin and the adhesiveness modifier.

7. The process for producing a composite of metal and resin according to claim 1, wherein the molding material contains from 0.15 to 1.2 parts by mass of the adhesive functional group based on 100 parts by mass of the total amount of the resin and the adhesiveness modifier.

8. The process for producing a composite of metal and resin according to claim 1, wherein the polar functional group is chemically bonded onto the surface of the metal part.

9. The process for producing a composite of metal and resin according to claim 1, wherein the plasma is generated under atmospheric pressure, and the bonding of the metal part and the resin part includes any one of a covalent bond, an ionic bond, a hydrogen bond and a van der Waals bond.

10. A process for producing a composite of metal and resin that includes a metal part and a resin bonded together, which comprises:

arranging the metal part;

feeding a discharging gas into a plasma apparatus, the discharging gas including an organic substance including anyone of an acrylic acid and allylamine;

generating a plasma in the plasma apparatus that activates the organic substance in the discharging gas;

bonding a polar functional group to a surface of the metal part by contacting the metal part with the plasma containing the organic substance and forming a radical of the organic substance and bonding the radical of the organic substance to the surface of the metal part as the polar functional group, the polar functional group including anyone of an unsaturated carboxyl group and an unsaturated amino group;

preparing a molding material that includes blending the resin with an adhesiveness modifier containing an adhesive functional group that bonds with the polar functional group bonded to the surface of the metal part, the adhesive functional group including anyone of an epoxy group, a carboxyl group, an amino group and a hydroxyl group; and forming the molding material on the surface of the metal part, wherein the polar functional group bonded to the surface of the metal part interacts with the adhesive functional group of the adhesive modifier contained with the molding material and bonds the metal part and the resin part.

11. The process for producing a composite of metal and resin according to claim 10, wherein the adhesiveness modifier is a modified ethylene-styrene copolymer where a copolymer of ethylene with styrene is modified with glycidyl methacrylate or a modified polyethylene where polyethylene is modified with glycidyl methacrylate.

12. The process for producing a composite of metal and resin according to claim 10, wherein the adhesive functional group is an epoxy group.

13. The process for producing a composite of metal and resin according to claim 10, wherein the resin is polyphenylene sulfide.

14. The process for producing a composite of metal and resin according to claim 10, wherein the metal is aluminum or copper.

15. The process for producing a composite of metal and resin according to claim 10, wherein the molding material contains from 5 to 40 parts by mass of the adhesiveness modifier based on 100 parts by mass of the total amount of the resin and the adhesiveness modifier.

16. The process for producing a composite of metal and resin according to claim 10, wherein the molding material contains from 0.15 to 1.2 parts by mass of the adhesive functional group based on 100 parts by mass of the total amount of the resin and the adhesiveness modifier.

17. The process for producing a composite of metal and resin according to claim 10, wherein the plasma is generated under atmospheric pressure, and the bonding of the metal part and the resin includes any one of a covalent bond, an ionic bond, a hydrogen bond and a van der Waals bond.

* * * * *